United States Patent Office 3,321,450
Patented May 23, 1967

3,321,450
PROCESS FOR THE MANUFACTURE OF COPOLYMERS OF UNSATURATED NITRILES, SAID COPOLYMERS CONTAINING SULFO GROUPS
Adolf Hartmann, Gessertshausen, near Augsburg, Wolfgang Burghardt, Bergheim, near Augsburg, and Peter Kresse, Augsburg, Germany, assignors to Farbwerke Hoechst Aktiengesellschaft vormals Meister Lucius & Brüning, Frankfurt am Main, Germany, a corporation of Germany
No Drawing. Filed Apr. 29, 1964, Ser. No. 363,597
Claims priority, application Germany, May 17, 1963, F 39,766
4 Claims. (Cl. 260—79.3)

The present invention relates to a process for the manufacture of copolymers of unsaturated nitriles, said copolymers containing sulfo groups, especially to a process for the manufacture of copolymers possessing an improved dyestuff affinity.

Macromolecular products of unsaturated nitriles are known. Such macromolecular products can be processed from solutions into shaped structures, such as yarns or fibers which lend themselves readily to drawing thus acquiring valuable technological properties. As unsaturated nitriles which are suitable for the manufacture of the macromolecular polymers or copoloymers, there may be mentioned especially acrylonitrile, methacrylonitrile and vinylidene cyanide (methylene malodinitrile, 1,1-dicyano ethylene). However, other unsaturated nitriles, such as fumaric acid dinitrile or itaconic acid dinitrile may also be used. The aforesaid unsaturated nitriles are usually not applied alone, but in mixture with other vinyl compounds, such as vinyl esters, especially vinyl acetate, furthermore polyvinyl chloride, vinylidene chloride as well as esters of acrylic acid or methacrylic acid. As a rule, such comonomers are used to influence the properties of the fibers or yarns in the desired manner, for example to improve the insufficient dyestuff affinity of the polyvinyl cyanides.

With regard to improving the dyestuff affinity, unsaturated basic or acid compounds have become especially interesting for industrial use as comonomers for the copolymerization or terpolymerization which compounds, when incorporated with the macromolecule, render possible the application of ionic dyestuffs. Such compounds are, for example, vinyl pyridine, vinyl imidazole, and basic acrylic acid esters, or vinyl sulfonic acid or styrene sulfonic acid. The polymerization or copolymerization of the unsaturated nitriles is carried out according to the known processes in the presence of free radicals in an inert solvent or diluent with the use of peroxides or redox systems as catalysts.

The manufacture of copolymers or terpolymers of vinyl cyanides, which co- or terpolymers contain sulfo groups and can be dyed with basic dyestuffs, meets with the difficulty that the unsaturated acids which have hitherto been used for this purpose can only be obtained by relatively expensive and cumbersome methods. This is especially inconvenient when manufacturing raw materials for fibers on a large scale. Another disadvantage is that the capability of these unsaturated acids to copolymerize with vinyl cyanides does not always fulfill practical requirements, as is the case, for example, with vinylidene cyanide and vinyl sulfonic acid.

Now we have found that these disadvantages can be avoided and copolymers of unsaturated nitriles containing sulfo groups be obtained by copolymerizing unsaturated nitriles with 0.1 to 20 mol percent (calculated on the amount of unsaturated nitriles applied) of sulfonated acenaphthylene. According to this process there can also be obtained copolymers containing sulfo groups when, in addition to the unsaturated nitriles, other vinyl compounds containing no cyano groups, preferably vinyl acetate, but also vinyl chloride, vinylidene chloride, acrylic or methacrylic acid esters, are copolymerized with sulfonated acenaphthylene.

The amount to be applied of sulfonated acenaphthylene depends in each case on the polymerization parameters of the reactants and the desired effect. There are preferably added amounts ranging from 0.5 to 10 mol percent, calculated on the total quantity of unsaturated nitriles and vinyl compounds containing no cyano groups.

Acenaphthylene which is obtained as a by-product in the distillation of tar is a cheap and easily accessible compound. It can easily be sulfonated according to known processes without prejudice to its unsaturated character, in which case generally only one sulfo group is substituted.

It was unexpected that sulfonated acenaphthylene which, the same as acenaphthylene itself, has a yellow color, readily forms colorless co- or terpolymers with vinyl cyanides, in which case the monomeric sulfonated acenaphthylene is incorporated almost quantitatively.

The method of carrying out the polymerization depends primarily on the properties of the unsaturated nitriles used and on the presence of further comonomers. For example, when acrylonitrile is used in an aqueous medium at a reaction temperature within the range of from 40° to 60° C., it is possible to operate with, for example, persulfates and hyposulfite as initiators. In contradistinction thereto, the presence of solvents which are free from hydroxyl groups, such as acetic anhydride, benzene or vinyl acetate is required when the polymerization is carried out with vinylidene cyanide in order to avoid ionic homopolymerization. It is advantageous to apply especially vinyl acetate in a large excess amount, approximately 2 to 10 times the amount of the unsaturated nitrile, since in this manner there is obtained simultaneously the copolymer of equimolar parts vinylidene cyanide and vinyl acetate, which is of practical interest.

The sulfonated acenophthylene which is advantageously dissolved in acetanhydride is then introduced in controlled amounts during the first third of the polymerization at a temperature ranging from 74° to 78° C. As catalysts for the polymerization there may be used peroxides, especially dichlorobenzoyl peroxide, or aziosobutyronitrile. The most favourable reaction conditions such as duration of the reaction, dosability, stirring mechanism and control of the temperature, have to be ascertained separately in each case. The yields obtained represent 80 to 95% of the theoretical yields.

The process of the invention can also be carried out continuously, in which case care has to be taken that the rate of dosing in the monomers is adjusted to their rate of conversion, that the finished polymer is drawn off continuously, for example by overflow, and that the unreacted monomer portions are recovered in a suitable manner.

The macromolecular reaction products containing sulfonated acenaphthylene, which are obtained by the process of the invention, are purified in the usual manner; the acrylonitrile polymers are washed, for example, with water, while the copolymers of vinylidene cyanide and vinyl acetate are washed with vinyl acetate, and dried under mild conditions.

By the process according to the invention there are obtained colorless products possessing a high thermostability which dissolve in dimethyl formamide or dimethyl sulfoxide, some of them dissolving in acetonitrile or the azeotrope thereof with water, or in acetone or butyrolactone. The products are processed from these solutions by known methods, for example by spinning them into hot air or coagulating them in precipitating baths.

With the use of acrylonitrile polymers, there may be employed as precipitating baths, for example, mixtures of water and dimethyl formamide or ethylene glycol, while with the use of polymers containing vinylidene cyanide mixtures of water and acetonitrile are suitable. Minor amounts of inorganic salts, for example sodium chloride or sodium sulfate, may be added to promote coagulation. Coagulation in the precipitating baths is advantageously carried out at an elevated temperature, generally at a temperature ranging from 60° to 75° C. The yarns obtained in this manner are, if necessary after having been subjected to a previous drying process, drawn advantageously also at an elevated temperature, for example within a range of from 50° to 150° C. in air, water or other indifferent media. After crimping and cutting there are obtained from these yarns colorless fibers possessing a high tensile strength and good textile properties, which lend themselves readily to coloration with basic dyestuffs, if necessary with the simultaneous use of swelling agents in the dye bath. Deep dyeings of good fastness properties can also be obtained with dispersion dyestuffs.

The following examples serve to illustrate the invention, but they are not intended to limit it thereto, the parts being by weight:

Example 1

A mixture comprising 300 parts boiled water and 22 parts acrylonitrile was placed in a vessel provided with stirrer, reflux condenser and nitrogen inlet pipe. When the bath had a temperature of 40° to 45° C. a solution of 0.3 part potassium persulfate in 10 parts water was added to the mixture and, after one minute, 0.15 part sodium hyposulfite in 10 parts water was added. In the course of one hour, 1.1 parts sulfonated acenaphthylene, dissolved in 15 parts water, were added dropwise to the mixture.

The aqueous solution was rendered turbid almost instantaneously at the beginning of the polymerization and a white polymer commenced to precipitate. After 3 hours of polymerization, the copolymer formed was filtered off with suction, washed and dried at 60° C. The yield amounted to about 80%.

The product had a viscosity of $\eta_{rel.}=1.62$ (measured in a solution of 1% strength by weight in dimethyl formamide at 25° C.) and a sulfur content of 0.6% by weight which corresponds to 5% by weight of sulfonated acenaphthylene. The product dissolved in the solvents usually employed for polyacrylonitrile, such as dimethyl formamide or dimethyl acetamide, and could be spun from these solutions by the dry- or wet spinning process into drawable, practically colorless yarns possessing high tensile strength and a good dyestuff affinity for basic dyestuffs and dispersion dyestuffs.

Example 2

A mixture comprising 6 parts anhydrous acetic acid and 5 parts vinylidene cyanide was placed in an agitator vessel provided with reflux condenser, thermometer and inlet pipe, 38.6 parts anhydrous vinyl acetate were added to the mixture and the whole was heated rapidly to a temperature ranging from 74 to 78° C., while agitating and passing through a current of nitrogen. After the addition of 0.012 part 2.4-dichlorobenzoyl peroxide, 0.12 part sulfonated acenaphthlyene, dissolved in 1 part acetanhydride, was added dropwise within a period of 30 minutes.

The turbidity manifesting itself at the beginning of the reaction condensed rapidly to become a white paste. A homogeneous pasty consistency of the reaction mass was maintained by adding again vinyl acetate as a diluent.

After 90 minutes, the terpolymer obtained was filtered off with suction, washed with vinyl acetate and dried at 50° C. The yield represented about 95% of the theoretical yield $\eta_{rel.}=2.2$ (measured in a solution of 1% strength by weight in butyrolactone at 25° C.).

The almost colorless product has a softening point of about 190° C. It dissolves not only in dimethyl formamide, but also in butyrolactone, acetonitrile and the azeotrope thereof with water. With this azeotrope a solution of 18% strength by weight was prepared with the addition of 0.5% by weight of finely divided titanium dioxide. This solution was spun at 70° C. into a precipitating bath containing 16% by weight of acetonitrile. The yarns were then drawn at 75° C. in a ratio of 1:4.5 in an aqueous solution of acetonitrile of about 30% strength by weight, and dried. The yarns had a tensile strength of 2.8 grams/denier and an elongation of 32%, they had a light appearance and could be dyed well with basic dyestuffs in open baths when 0.6% by weight of phthalic acid dibutyl ester was added thereto.

We claim:
1. Copolymers of unsaturated nitriles containing sulfo groups obtained by polymerizing, in the presence of a free radical catalyst, an unsaturated nitrile selected from the group consisting of acrylonitrile, methacrylonitrile and vinylidene cyanide with 0.1 to 20 mol percent, calculated on the amount of the unsaturated nitrile, of sulfonated acenaphthylene.

2. Copolymers of unsaturated nitriles containing sulfo groups obtained by polymerizing, in the presence of a free radical catalyst, an unsaturated nitrile selected from the group consisting of acrylonitrile, methacrylonitrile and vinylidene cyanide, with vinyl acetate and 0.1 to 20 mol percent, calculated on the amount of the unsaturated nitrile and vinyl acetate, of sulfonated acenaphthylene.

3. The copolymer as claimed in claim 1, wherein the unsaturated nitrile is acrylonitrile and the sulfonated acenaphthylene is present in an amount of 0.5 to 10 mol percent.

4. The copolymer as claimed in claim 2, wherein the unsaturated nitrile is vinylidene cyanide, the vinyl acetate is present in an amount seven times by weight of said nitrile, and the sulfonated acenaphthylene is present in an amount between 0.2 and 5 mol percent, calculated on the total amount of vinylidene cyanide and vinyl acetate.

References Cited by the Examiner

UNITED STATES PATENTS 3,119,798   1/1964   Moberly et al. _____ 260—93.7

JOSEPH L. SCHOFER, *Primary Examiner.*

D. K. DENENBERG, *Assistant Examiner.*